(12) United States Patent
Hay, II

(10) Patent No.: US 10,970,943 B2
(45) Date of Patent: Apr. 6, 2021

(54) METHOD AND APPARATUS FOR A VEHICLE FORCE INDICATOR

(71) Applicant: Timothy Robert Hay, II, Jacksonville, FL (US)

(72) Inventor: Timothy Robert Hay, II, Jacksonville, FL (US)

(*) Notice: Subject to any disclaimer, the term of this patent is extended or adjusted under 35 U.S.C. 154(b) by 236 days.

(21) Appl. No.: 16/004,520

(22) Filed: Jun. 11, 2018

(65) Prior Publication Data

US 2019/0139327 A1 May 9, 2019

Related U.S. Application Data

(60) Provisional application No. 62/517,424, filed on Jun. 9, 2017.

(51) Int. Cl.
| | | |
|---|---|---|
| *G06F 17/00* | (2019.01) | |
| *G07C 5/00* | (2006.01) | |
| *B60W 40/10* | (2012.01) | |
| *B60Q 1/44* | (2006.01) | |
| *G07C 5/08* | (2006.01) | |

(52) U.S. Cl.
CPC ............ *G07C 5/008* (2013.01); *B60Q 1/444* (2013.01); *B60W 40/10* (2013.01); *G07C 5/0825* (2013.01); *G07C 5/0833* (2013.01); *G07C 5/0841* (2013.01)

(58) Field of Classification Search
CPC .... G07C 5/008; G07C 5/0825; G07C 5/0833; G07C 5/0841; B60Q 1/444; B60Q 9/00; B60Q 2900/10; B60W 40/10

USPC ...................................................... 701/29.3
See application file for complete search history.

(56) References Cited

U.S. PATENT DOCUMENTS

| | | | | |
|---|---|---|---|---|
| 4,788,773 A | * | 12/1988 | Palsgard | G01C 9/08 33/333 |
| 6,115,668 A | * | 9/2000 | Kaneko | G01C 21/28 340/988 |
| 10,397,495 B1 | * | 8/2019 | Graber | B64F 1/005 |
| 2004/0113818 A1 | * | 6/2004 | Yokokohji | G06T 7/70 340/995.1 |
| 2005/0273216 A1 | * | 12/2005 | Imai | B60K 35/00 701/1 |
| 2007/0176851 A1 | * | 8/2007 | Willey | G02B 27/0093 345/32 |
| 2009/0005961 A1 | * | 1/2009 | Grabowski | G02B 27/01 701/532 |
| 2010/0164702 A1 | * | 7/2010 | Sasaki | G01B 21/22 340/438 |
| 2011/0282554 A1 | * | 11/2011 | Keye | A01M 7/0057 701/49 |
| 2012/0310594 A1 | * | 12/2012 | Watanabe | G01C 9/06 702/154 |
| 2013/0299264 A1 | * | 11/2013 | Araki | B62K 11/007 180/220 |
| 2015/0210274 A1 | * | 7/2015 | Clarke | G08G 1/167 382/104 |

(Continued)

*Primary Examiner* — Ronnie M Mancho
(74) *Attorney, Agent, or Firm* — Rogers Towers, P.A.; Joseph P. Kincart

(57) ABSTRACT

The present disclosure relates to methods and apparatus to provide a vehicle force indicator responsive to one or more of: an amount of tilt of a motor vehicle, an amount of acceleration and/or deceleration of the motor vehicle and a correlation of tilt and speed with location of the motor vehicle.

14 Claims, 5 Drawing Sheets

(56) References Cited

U.S. PATENT DOCUMENTS

| | | | |
|---|---|---|---|
| 2015/0293362 A1* | 10/2015 | Takahashi | G09G 5/00 |
| | | | 348/47 |
| 2016/0187661 A1* | 6/2016 | Yajima | G02B 27/0172 |
| | | | 345/8 |
| 2016/0371476 A1* | 12/2016 | Turgeman | G06F 21/31 |
| 2017/0168481 A1* | 6/2017 | Flanigan | G01R 29/0892 |
| 2017/0169612 A1* | 6/2017 | Cashen | G06T 19/20 |
| 2018/0075669 A1* | 3/2018 | Yeh | G01S 19/53 |
| 2018/0356842 A1* | 12/2018 | Tankersley | G05D 1/101 |

* cited by examiner

METHOD AND APPARATUS FOR A VEHICLE FORCE INDICATOR

This application claims priority to the U.S. Provisional Application No. 62/517,424; filed Jun. 9, 2017, entitled METHOD AND APPARATUS FOR A VEHICLE FORCE INDICATOR, the contents of which are relied upon and hereby incorporated by reference.

FIELD OF THE DISCLOSURE

The present disclosure relates to methods and apparatus to provide a vehicle force indicator responsive to one or more of: an amount of tilt of a motor vehicle, an amount of acceleration and/or deceleration of the motor vehicle and a correlation of tilt and speed with location of the motor vehicle.

BACKGROUND OF THE DISCLOSURE

Vehicle safety is highly regulated in many countries. For example, in the U.S., commercial vehicle safety is regulated by 49 C.F.R. Chapter III, Subchapter B, and in particular Part 393, which regulates "Parts and Accessories Necessary for Safe Operation". Passenger vehicle safety is regulated by 49 C.F.R. Chapter V, and in particular Part 571, which regulates "Federal Motor Vehicle Safety Standards". For example, 49 C.F.R. § 571.108 specifies manufacturer-installed lamps, reflective devices, and associated equipment, including brake lights.

U.S. Federal regulations in general specify gross features of head lights, brake lights, turn signals, backup indicators and other exterior or interior illumination signals. The gross features may specify color, minimum number of lights, their placement, and the like, but do not specify specific features such as shape of indicators or visible operation much beyond a simple on/off when a condition is true (e.g., brakes are applied, vehicle in reverse, etc.).

However, advances in technology have made available more sophisticated, sensitive, and/or low-cost sensors that until now have not been fully integrated into vehicular systems. Furthermore, display technology, such as LED lighting, has advanced to become very flexible with respect to physical installation and what conditions may be indicated by the display technology, either inside or outside the vehicle. Although text-based diagnostic screens are available, for example through a controller area network (CAN) interface, such text-based diagnostic screens are usually available only during non-operating diagnostic maintenance. The text-based diagnostic screens would be distracting to a driver who is actively driving, would be unintelligible to anyone outside an operating vehicle, and may require translation from a cryptic code to a natural language explanation of the indicated condition.

Therefore, what is needed is integration of more modern sensor technology in order to monitor a vehicle or the load it is carrying, and provide a more flexible indication of a condition of a vehicle or its load, compatible with applicable safety regulations.

SUMMARY OF THE DISCLOSURE

Embodiments in accordance with the present disclosure include methods and apparatus to provide a vehicle force indicator. The indication of vehicle force may be used to provide force-responsive indicators externally and/or internally to the vehicle. Embodiments may also use the vehicle force indicator to monitor a load carried by the vehicle, and infer a status of the load based upon an analysis of differential forces recorded on the load and on the vehicle.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure.

Figure 1:
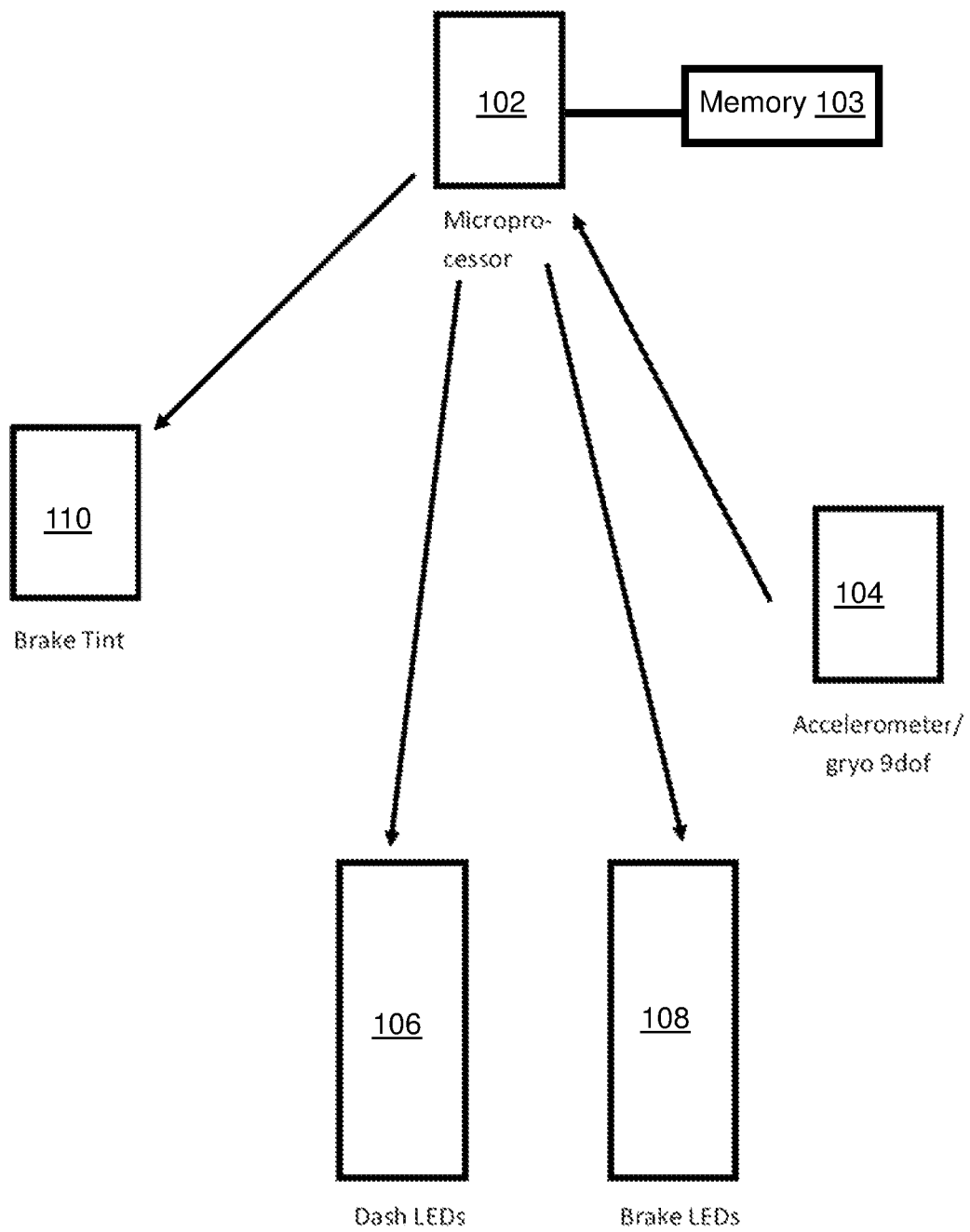
FIG. 1 illustrates a first system to provide a vehicle force indicator, in accordance with an embodiment of the present invention.

The drawings are not necessarily drawn to scale unless clearly indicated otherwise. Dimensions, where shown, are typical dimensions in units of inches.

DETAILED DESCRIPTION

In the following sections, detailed descriptions of examples and methods of the disclosure will be given. The description of both preferred and alternative examples though through are exemplary only, and it is understood to those skilled in the art that variations, modifications, and alterations may be apparent. It is therefore to be understood the examples do not limit the broadness of the aspects of the underlying disclosure as defined by the claims.

As used herein, velocity is a vector quantity that describes a change in position over time. Velocity includes both a magnitude and a direction. The magnitude of velocity (without necessarily referring to direction) is referred to as speed. Deceleration is a negative change in speed over time, and acceleration is a positive change in speed over time, unless the context of usage clearly indicates otherwise. A vector acceleration is a vector quantity that refers to a change in velocity over time, and includes both a change in speed (positive or negative), together with a direction of the change in velocity. A jolt is a vector quantity that refers to a change in vector acceleration over time.

Embodiments in accordance with the present disclosure may provide a novel visual display that is controlled by a parameter measured from a vehicle sensor. The visual display may be user configured. The measured parameter may be, for example, an operating condition of the vehicle itself, or a condition of cargo carried by the vehicle, and so forth.

In one embodiment, a customized vehicle taillight display may be provided. The customized taillight display may augment a manufacturer-installed taillight display. In some embodiments, the customized taillight display may provide a braking (deceleration) indication. In other embodiments, the customized taillight display may provide an indication of acceleration or deceleration in an axis non-parallel to the main direction of vehicle travel (i.e., other than forward or backward), such as a lateral direction (i.e., left and right).

In some embodiments, a customized taillight display in accordance with an embodiment of the present invention may be adapted to be usable with a motorized, three-wheeled vehicle such as the Polaris Slingshot®. Such three-wheeled vehicles usually are configured to have two front wheels that provide drive force and steering, and a single rear wheel to provide support for the rear of the vehicle. Such three-wheeled vehicles inherently are less stable than a four-wheeled vehicle. They are even less stable than a conventional two-wheeled motorcycle, because the three-wheeled vehicle cannot lean into turns as much as a conventional motorcycle. A customized taillight display for such a vehicle may provide warning to drivers of surrounding vehicles, in order to let the drivers of the surrounding vehicles know that the vehicle with the customized taillight display may be unstable or experiencing unusual forces at that moment, and that the other drivers should be vigilant. Conversely, the customized taillight display also may indicate that an action is less severe, such as a light tap on the brakes.

FIG. 1 illustrates a system 100 for a vehicle force indicator, in accordance with an embodiment of the present invention. System 100 includes a microprocessor 102 coupled to a memory 103 and to a sensor 104 (e.g., a multi-axis accelerometer, gyroscope, inertial navigation sensor, or the like).

In some embodiments, sensor 104 may provide nine degrees of freedom, including three axes of accelerometer data, three axes gyroscopic, and three axes of magnetic sensing (e.g., a compass). An exemplary sensor 104 is an Adafruit 9-DOF Inertial Measurement Unit (IMU) Breakout—L3GD20H+LSM303. A magnetic sensor component of sensor 104 may provide a selectable range of magnetic field strength measurement, such as one of 4 gauss, 8 gauss, 12 gauss and 16 gauss. A gyroscopic sensor component of sensor 104 may provide a selectable range of angular rate measurement, such as 245 degrees per second (dps), 500 dps and 2000 dps.

Microprocessor 102 also may be coupled to output indicators such as dashboard lights 106 and auxiliary brake lights 108. Lights 106, 108 may be light emitting diodes (LEDs). Lights 106, 108 may be aftermarket items, provided in addition to factory-installed dashboard lights and factory-installed brake lights. Microprocessor 102 also may be coupled to an electrically-controlled tint and its associated control interface (collectively, tint 110), described below in further detail.

In some embodiments, system 100 may operate continuously by reading from sensor 104 and reacting accordingly. For example, if sensor 104 includes an accelerometer, and if sensor 104 indicates a braking or deceleration condition, microprocessor 102 may trigger brake lights 108 to flash in one of a predefined pattern. A different predefined pattern may be selected for flashing, depending upon measurements read from sensor 104. For example, a progressively larger pattern of lights that are emitting light, a brightness of light emitted or a pattern with a progressively faster repetition rate may be selected as progressively larger thresholds are exceeded by the measurement read from sensor 104.

In some embodiments, an indication of lateral acceleration (e.g., a value indicating an amount of acceleration itself, or an alert or a warning based on the acceleration compared to a threshold) may be displayed in real time via an application ("app") program executing on a tablet device, a smartphone or other mobile device, and/or a hardware display such as an LED dash-mounted strip. The indication may take the form of causing the LED strip to flash, or by causing an audio and/or visual signal to be emitted from the mobile device or other output device when a user defined threshold is achieved or exceeded. For example, the LED strip may include a WS2812B 5050 RGB LED strip, having fifty-five individually addressable LEDs. Other indicators capable of interacting with human sensory capabilities are also within the scope of the present invention. Additionally, one or more of visual, audible and mechanical interaction devices may be used to communicate with a user. Visual and Audible interaction devices will work with wavelengths capable of being detected by the human body. Mechanical interaction may include a device that causes vibration at a frequency detectable by a human. The device may be incorporated into a steering wheel, a handlebar, a user's glove or other area allowing a user to stay focuses on acts of driving and still receive input via a tactile indicator. The tactile indicator may include for example a piezo electric device. In some embodiments, a lower frequency may indicate a lower level of one or both of tilt and G force. Additionally, some embodiments may include a pressure indicator, such as a ring or wrist strap that may constrict on a body part based upon an amount of tilt and/or G-Force.

In some embodiments, an app may be able to control or trigger an LED sequence pattern for other purposes (e.g., a "party" show mode) when system 100 is stationary or otherwise not actively being used to monitor an acceleration.

In some embodiments, acceleration measured by sensor 104 may trigger a display involving dashboard lights 106, instead of or in addition to involving brake lights 108.

In some embodiments, lights 108 may be covered by an electrically-controllable tint 110. In this configuration, lights 108 may be continuously lit, but tint 110 may be normally opaque. Tint 110, when opaque, may take on a black color, or another color such as a color selected to match or complement the vehicle color. Under quiescent conditions, light from lights 108 is blocked by tint 110, causing an observer to see no light being emanated from the combination of lights 108 and tint 110. When microprocessor 102 has determined that lights 108 should appear to an observer to be lit (e.g., if the vehicle is braking), microprocessor 102 will control tint 110 such that it becomes substantially transparent, thus allowing light from lights 108 to be perceived by an observer. Lights 108 may be controlled by microprocessor 102 to produce a visual pattern while tint 110 is transparent.

In some embodiments of operating a customized taillight display, such as system 100, dashboard lights 106 and auxiliary brake lights 108 may be activated by depressing a brake pedal, which can be detected by one of various methods such as pressure and movement, and at various locations such as the brake pedal itself, from the CAN system directly, or substantially any other location functionally between the brake pedal and the brake pads and rotor.

Although some embodiments may be initiated by depressing a brake pedal or otherwise detecting that a driver has depressed the brakes, the magnitude of the resulting deceleration may be read from an independent sensor, e.g., a separate accelerometer that may include at least a three-axis accelerometer. Other sensors may include a speedometer-based sensor, or a sensor based on wheel rotation rate, but these may not provide as fast a response as other sensor technologies and may not provide accurate information during skidding conditions. External vehicle sensors used to support autonomous driving (e.g., radar, optical, acoustic, etc.) used to detect fixed objects in the environment (e.g., curbs, lane markers, signs, telephone poles, etc.) also may be used to detect decelerations.

In some circumstances such as a rotation around a vertical axis (e.g., a spin, a fishtail, a yaw rotation, etc.), a deceleration in one axis (e.g., forward) may be accompanied by an acceleration in an orthogonal axis (e.g., sideways). In some circumstances such as a vehicle spin, different parts of the vehicle may experience different vector accelerations.

In some embodiments, a process to provide a vehicle force indicator may include reading a vector acceleration (e.g., a deceleration) from a sensor, e.g., a sensor as discussed above. Some specific embodiments of the present invention include multiple components incorporated into a single package. For example, a package may include a processor and memory in logical communication to execute programmable code and also in one or more of logical, electrical and optical communication with a sensor, such as an accelerometer, a Global Positioning Device (GPS), a clock, calendar, camera, CCD sensor, display, piezo electric device, thermoelectric device, or other device. With one or more such devices combined into a single unit. Specific examples may include one or more of: an Android device, an IOS device, such as an Apple iPhone or Apple tablet or other programmable mobile device.

In still other embodiments, acceleration may be detected from a sensor (e.g., sensor 104), and a pattern of lights displayed using lights 108, based on selectable mapping of magnitude of acceleration to a pattern of lights. For example, a nonzero acceleration less than a first threshold may be mapped to a slow pulsing pattern; an acceleration above the first threshold but below a second threshold may be mapped to a medium-rate pulsing pattern; and an acceleration above the second threshold may be mapped to a fast pulsing pattern. Other embodiments may use different types of patterns and/or a different number of thresholds.

In some embodiments, lights 108 may be activated by deceleration of the vehicle without a brake pedal being depressed.

In another aspect, acceleration of the vehicle may be monitored constantly. If deceleration is detected (e.g., based on a timeframe snapshot of readings and processed over a sliding window by averaging, or discarding outlier measurements, etc.). Outlier measurements may represent jolts caused by potholes, etc. As with accelerations, a value of measured deceleration may be detected from a sensor (e.g., sensor 104), and a pattern of lights may be displayed using lights 108, based on selectable mapping of magnitude of deceleration to a pattern of lights.

In some embodiments, an app may be provided on a smart device, smartphone (e.g., iPhone® or Android™ compatible device), a tablet, or other mobile device. The mobile device may be paired with system 100 via a short-range communication technology (e.g., wirelessly by Bluetooth™) in order to receive live data from sensor 104. The mobile device may also be used to transmit data to a third party, such as a racing crew, event organizer or person responsible for the vehicle.

In some embodiments, system 100 may detect from sensor 104, and provide to a driver or other user, an indication of lateral (i.e., sideways) force (e.g., in units of "G"s), an indication of acceleration or deceleration in a forward direction, and indication of angular motion (e.g., to detect a spin, fishtail, or similar motion).

Measurements from sensor 104 may be smoothed via a moving signal processing window. A signal processing window length may be chosen so that legitimate, short events of interest detected by sensor 104 are not excessively obscured. For example, the window length may be selected or provisioned to be no larger than the shortest legitimate event of interest. A legitimate event may be one caused by driver action (e.g., steering, braking, acceleration, etc.). By way of counterexample, an illegitimate event may be one caused by a minor external event such as striking a relatively small pothole (i.e., a pothole that does not cause damage to the vehicle). However, it still may be preferable to detect and report a major external event such as a collision or striking a pothole that causes vehicle damage. An example of a short event may be a quick tap of the brakes lasting approximately 0.1 seconds. Excessive obscuring would involve decreasing the magnitude of a detected legitimate event by more than a selectable or provisionable threshold (e.g., more than 10%, more than 25%, etc.).

In some embodiments, dashboard lights 106 to display an indication of measurements from sensor 104 may include an electroluminescent display (e.g., LED, backlit LCD, etc.) in a form such as the raw numeric reading, a numeric reading scaled to a range (e.g., 0% to 100%), a bar display approximately scaled to a range (e.g., one to five bars, etc.), and so forth. A bar-based display may grow in one direction (e.g., left-to-right) or in two directions (e.g., starting in the middle and growing outward). Dashboard lights 106 may be configured to provide a flexible display, for example, a main measurement such as acceleration by default, or a selectable display of substantially any measurement from sensor 104 (e.g., any of nine degrees of freedom), and so forth.

Dashboard lights 106 may be configured to display simultaneously more than one parameter. For example, a number of displayed bars may indicate an acceleration value, and a tilt angle of the display (e.g., bars tilted to the left or to the right) may indicate a level of lateral force (i.e., "G-force"). Other controllable characteristics of dashboard lights 106 may be used, such as color, intensity, or a time-varying effect such as a pulsation or perceived rotation.

Dashboard lights 106 may provide an enhanced display if a threshold level detected by sensor 104 is exceeded. An enhanced display is one that is more likely to be noticed quickly by a person such as a driver. For example, an enhanced display may be one that is brighter, or has a more alarming color (e.g., red instead of green), or has a time-varying effect (e.g., pulsing or flashing), and so forth. An individual threshold may be provided for each parameter measured by sensor 104. A default code such as "0" or "9999" may be provided for any parameter for which exceeding the threshold is not of substantial concern (e.g., exceeding a magnetic field limit).

In some embodiments, data processed by system 100 may be stored or logged to a nonvolatile memory. The nonvolatile memory may be provided as, e.g., part of memory 103, or a separate removable flash drive (e.g., an SD card, USB drive, etc.), or as a "black box" intended to be survivable in case of a crash.

If logging data, the data may be circularly written, such that the newest data will overwrite the oldest data if necessary given the storage medium capacity. Data logging may include logging G-forces, paired with date, time, and/or GPS location data that may be acquired from sensor 104 or another sensor, which may be useful for overlay analysis. The nonvolatile memory also may be useful for storing user settings and preferences. Data that has been successfully transmitted and received at another location may also be marked for overwriting. An acknowledgement signal of successful transmission may predicate data being overwritten.

In some embodiments, tint 110 may be provided as an electrically activated tinting film, such as Smart Tint®. Tint 110 may provide a selectable level of transparency (as measured by lumens of light output from lights 108), ranging from opaque when turned off, to substantially fully transparent when fully energized. Tint 110 may be provided to a plurality of lights 108 if a plurality of lights 108 is provided. Tint 110 may be controlled based upon a detected condition such as a measurement or range of measurements from sensor 104, or by detection of a user action such as pressing on the brakes, or user selection (e.g., an "on" switch, by selecting a special operating mode, etc.), and so forth. In some embodiments, tint 110 may be controlled by microprocessor 102 in order to play or replay a predefined sequence or pattern of activating tint 110 (e.g., to provide a perceived flashing pattern from lights 108).

In some embodiments, a special operating mode may include a "party mode", such that lights 108 may appear to display a pattern selected by a user. The pattern may include a predefined pattern, or may include a random or pseudo-random pattern. In some embodiments, dashboard lights 106 and/or an in-vehicle music system also may respond to, or be synchronized with, the party mode. In some embodiments, a smartphone or other mobile device may control, respond to, and/or be synchronized with the special operating mode.

Figure 2:
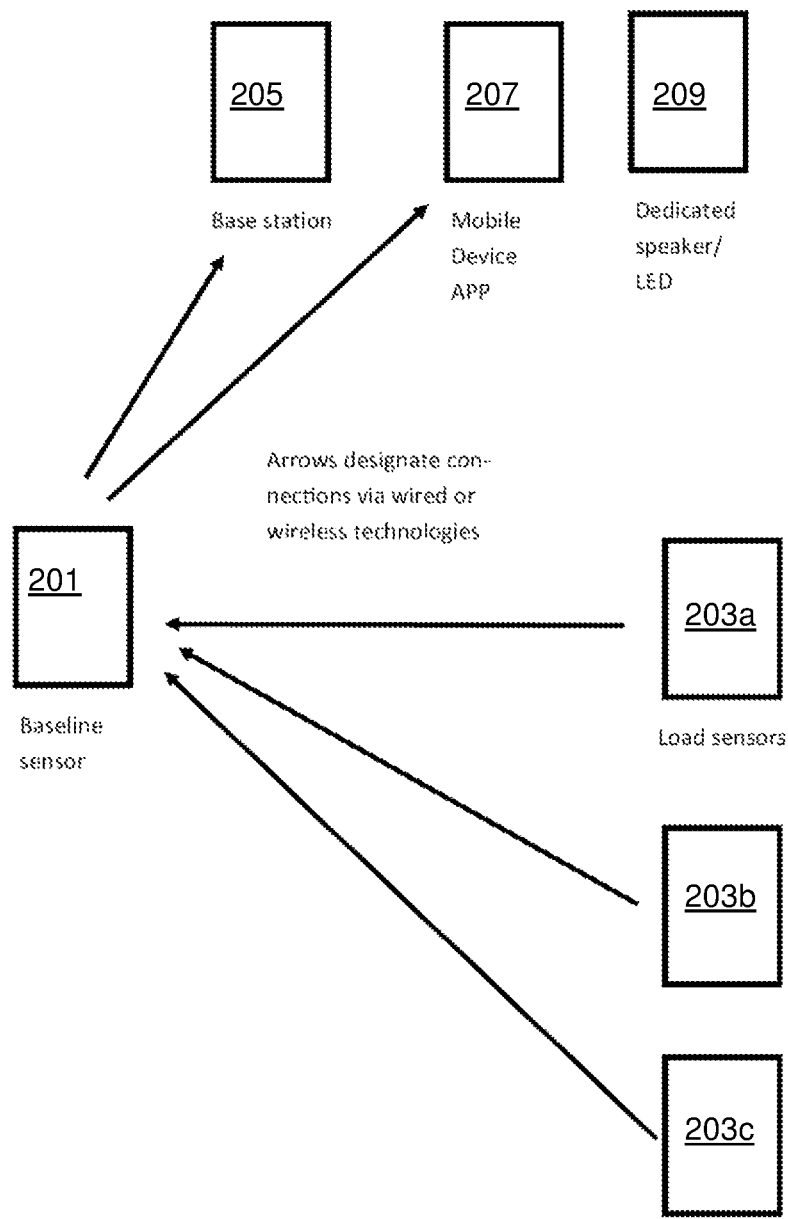
FIG. 2 illustrates a second system to provide a vehicle force indicator, in accordance with an embodiment of the present invention.

FIG. 2 illustrates a system 200 in accordance with an embodiment of the present invention. System 200 may be useful to provide a cargo load monitor, e.g., a cargo load shift monitor for a truck. System 200 may include a baseline sensor 201 and one or more individual load sensors 203a, 203b, 203c (collectively, load sensors 203). Baseline sensor 201 may act as a master sensor or controlling sensor, to collect measurements from load sensors 203, and report the collected measurements to a base station 205 and/or mobile device 207. Output device 209 (e.g., LED display(s) and/or an audio interface) may provide an alert if an anomalous condition is detected by system 200.

System 200 may operate by using acceleration and/or gyroscopic data (e.g., as might be obtained from a sensor such as sensor 104) that is coupled to each load of interest, and a baseline accelerometer/gyro coupled to the vehicle itself (e.g., on the bed of the shipping medium). Monitoring differences between sensors 203 and baseline sensor 201 is useful to remove the effect of vehicle motion from the measurements by sensors 203.

Components of system 200 may be communicatively coupled by use of wireless links (e.g., Bluetooth™ or other Radio Frequency "RF" technology), wired links, or a combination of the two. In some embodiments, baseline analyzer 201 may perform substantially all of the comparison processing, and may send alerts to mobile device app 207, base station hardware monitor 205 and/or hard wired alerting device 209 (e.g., speakers and/or lights). Base station 205 also may be able to receive substantially all data from both baseline sensor 201 and load sensors 203, and perform the processing or just provide alerts from baseline analyzer 201 and display the resulting warnings.

In some embodiments, setting up baseline analyzer 201 and an associated monitor and/or transmitter may include steps of first rigidly coupling baseline analyzer 201 to a base, or bed, or other area near to where a monitored load is stored (e.g., trunk, trailer, floor of car, etc.). Measurements from load sensors 203 and/or baseline analyzer 201 may be marked with date and time indicia, which may be useful for later analysis.

In some embodiments, a method of operating system 200 may include continuously monitoring baseline analyzer 201, comparing accelerometer and gyroscopic measurements from baseline analyzer 201 to corresponding measurements from the load sensors 203 coupled to baseline analyzer 201, detecting data that indicates load(s) coupled to load sensors 203 have shifted or are shifting, and sending an alerts to base station 205, to mobile device app 207, and/or directly to audio or visual interface 209.

In some embodiments, system 200 (through either base station 205 or mobile device 207) may receive data from baseline analyzer 201 via a wired and/or wireless interface, and compares data from among the various load sensors 203 to try to detect anomalies. In other embodiments, base station 205 may receive data directly from load sensors 203, depending upon configuration by a user.

In some embodiments, system 200 (through either base station 205 or mobile device 207) may display live data and alerts from load sensors 203, and base station 205 may include a user interface (e.g., a setup menu) to receive instructions from a user regarding options for system operation.

In some embodiments, system 200 (through either base station 205 or mobile device 207) may determine whether data from any of the load sensors 203 differs from the corresponding data from base station 205 by more than a threshold amount. If so, a visual and/or audio alarm may be activated, e.g., through audio or visual interface 209. In some embodiments, the threshold amount may be adjusted by a user.

In some embodiments, system 200 (through either base station 205 or mobile device 207) may log all data in a nonvolatile memory for review later. In some embodiments, all logged data may be displayed or accessed in order to analyze what G-forces had been acting upon the trailer bed and the load. This analysis may help identify the cause of damage to cargo during transport.

In some embodiments, system 200 (through either base station 205 or mobile device 207) may include an interface to a satellite-based guidance and mapping system (e.g., Global Positioning System (GPS), Galileo, Beidou, Glonass, or the like). The interface may be used to fuse data from load sensors 203 and base station 205 with relatively precise position information.

In some embodiments, system 200 (through either base station 205 or mobile device 207) may stream live data (e.g., raw data or processed data) to a remote support site via a long-distance wireless technology such as cellular signals, short message service (SMS) signals, satellite communication signals, and so forth.

In some embodiments, system 200 (through either base station 205 or mobile device 207) may be able to configure load sensors 203 in addition to monitoring load sensors 203, depending on options selected.

In some embodiments, application program 207 executing on a mobile device may receive data from load sensors 203 and base station 205 via a wireless technology (e.g., Bluetooth, other radios waves, etc.), and compares data as received directly from load sensors 203 or directly from base station 205.

Figure 3:
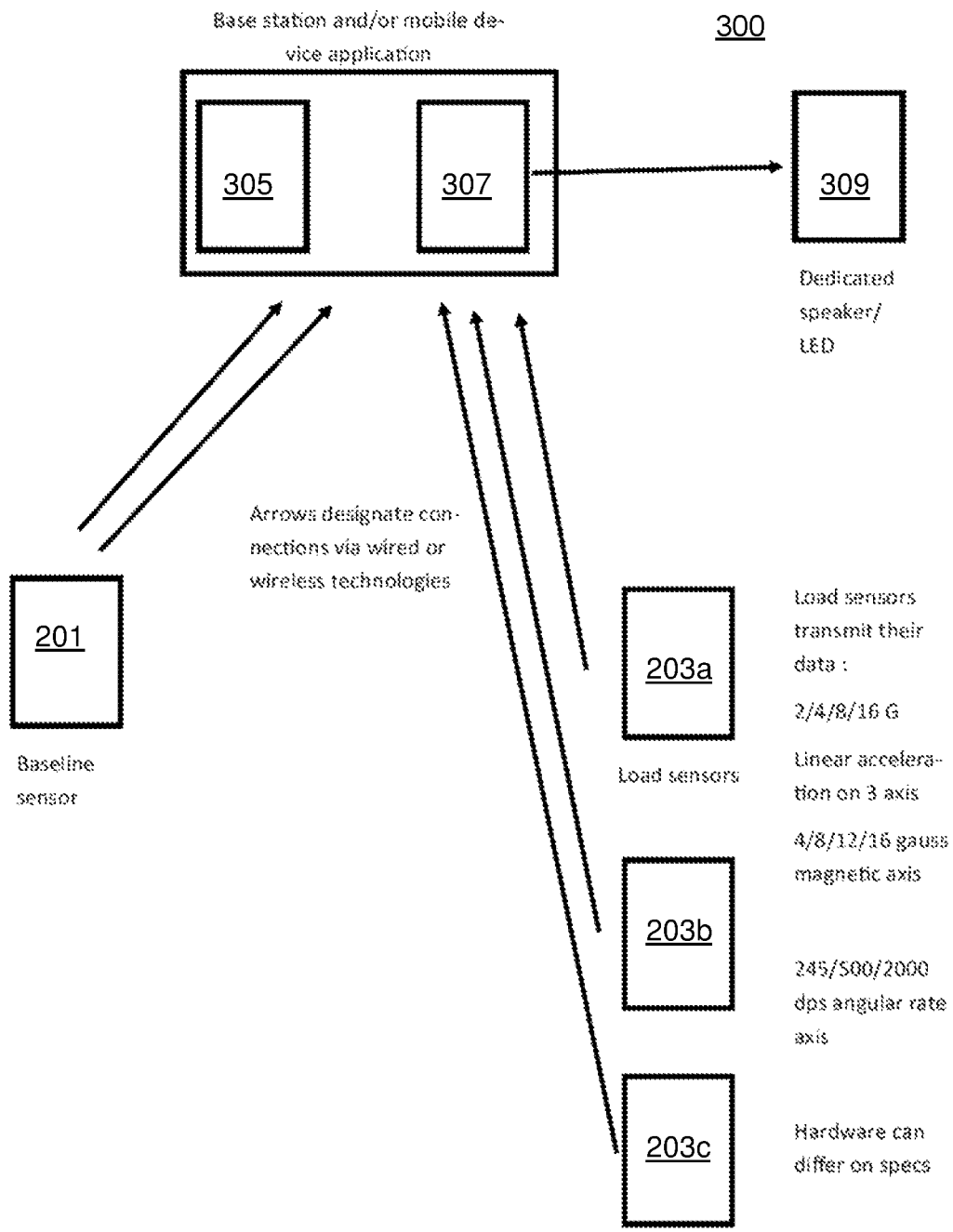
FIG. 3 illustrates a third system to provide a vehicle force indicator, in accordance with an embodiment of the present invention.

FIG. 3 illustrates a system 300 in accordance with an embodiment of the present invention. System 300 is similar to system 200, with one difference being that data from load sensors 203 may be received directly by either base station 305 or mobile device 307, rather than first being collected by baseline analyzer 201. Other components of system 300 have already been described with respect to like-numbered components of system 200.

Figure 4:
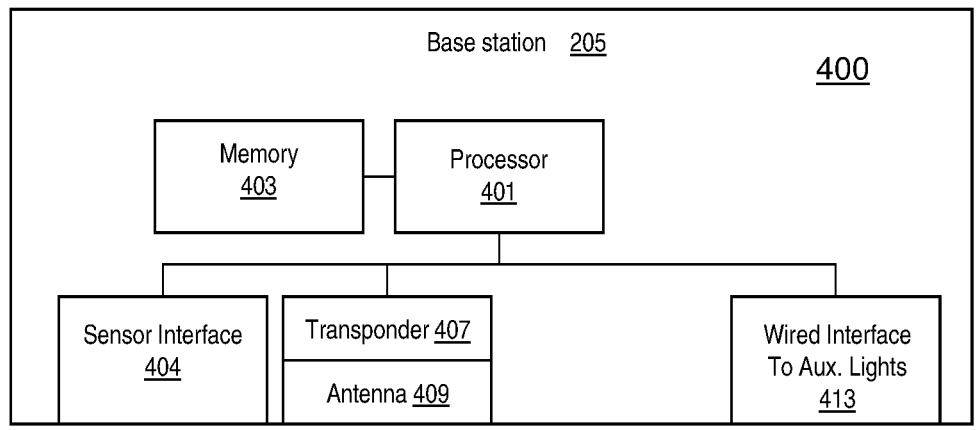
FIG. 4 illustrates a functional block diagram of a control module, in accordance with an embodiment of the present invention.

FIG. 4 illustrates a functional block diagram 400 of an embodiment of base station 205. FIG. 4 is also applicable to base station 305. Diagram 400 includes processor 401 coupled to memory 403. Processor 401 may be coupled to sensor interface 404. Processor 401 also may be coupled to one or both of transponder 407 and wired interface 413 to audio or visual interface 209. If transponder 407 is provided, it also may be coupled to antenna 409. Antenna 409, if provided, may be internal or external to a body of base station 205. Sensor interface 404 couples externally to a sensor such as load sensors 203.

Figure 5:
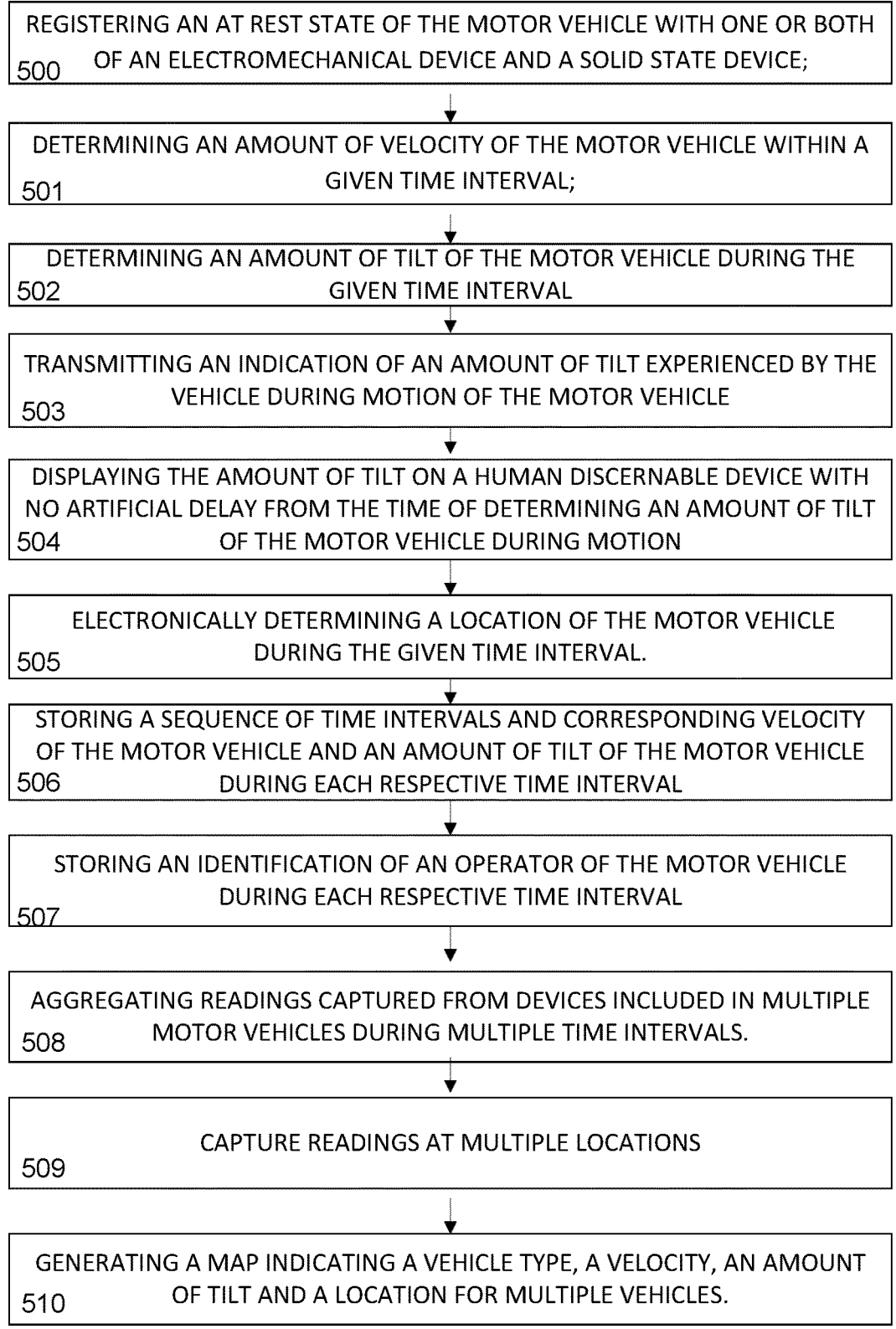
FIG. 5 illustrates a flow chart of steps that may be executed in some implementations of the present invention.

Referring now to FIG. 5, a series of steps are described that may be performed in the exercise of various embodiments of the present invention. At step 500, an initialization may be made that registers an at rest state of a vehicle. At rest may include an incline the vehicle in on (incline measurements may include, one or both of forward to back or right to left). A state of rest generally indicates no movement of the vehicle.

At step 501, an amount of velocity of the vehicle within a given time interval is determined and stored. A Time interval may be triggered by an event. The event may include a start of acceleration, or a state of the vehicle, such as reaching a threshold velocity of amount of angle of tilt (lean or front to back).

At step 502, an amount of tilt of the vehicle may be determined and stored. An amount of tilt may be in relation to one or more of: a level state of the vehicle, a resting state of the vehicle, a change in state of the vehicle, or other reference.

At step 503, the amount of tilt of the vehicle, may be transmitted. In some embodiments, the amount of tilt is transmitted during motion of the vehicle.

At step 504, an amount of tilt is displayed on one or more human discernable devices. As discusses herein, the human discernable device may be located in one or more of: a manner discernable to an operator of the vehicle; a manner discernable for a location behind the vehicle; and in a manner remote to the vehicle.

At step 505, a location of the motor vehicle may be determined electronically. Electronic determination may include, one or more of: global positioning system determination: triangulation; radar, LIDAR, laser or using other location determining equipment.

At step 506, a sequence of time intervals is stored and corresponding velocity of the vehicle. An amount of tilt of the motor vehicle may also be stored for the same or different time intervals.

At step 507, an operator of the vehicle may also be stored during some or all of the respective time intervals of step 506. The stored data may be used to profile the performance of a particular operator and allow analysis to be made to increase the performance of an operator. Performance objectives may include, by way of non-limiting example, one or more of: increased speed (such as increased speed of a race route); increased safety and vehicle preservation.

At step 508, multiple sensor readings and transmitted data may be aggregated. The aggregation may be from one or multiple vehicles and from one or more venues. Aggregation may also be accomplished over multiple time intervals.

At step 509, readings may be captured at multiple locations. Locations may include geographic locations travelled by the vehicle. In another aspect, in some embodiments, readings captured at multiple locations may be transmitted to different destinations, such as an operator's log, a racing team log and a factory log.

At 510 a map indicating one or more of: a vehicle type, a velocity, an amount of tilt and a location of other vehicles may be generated.

It is also within the scope of the invention to perform analysis, artificial intelligence extrapolations, unstructured query processing and the like on collected data. Analysis may determine one or more of: a performance level of a vehicle; a performance level of an operator; a performance level of a team; a performance level of a model of a vehicle; a performance level of a brand of vehicle; deployed use of a vehicle and/or vehicle type and other analysis. Collected data may also be combined with other data for analytic and predicative purposes. For example, it may be combined with environmental data, such as weather conditions; components used, such as tires, fuel, suspension components, engine components (cam, valve, piston, port, injector, etc.) and external shape of a vehicle (including add on cowlings, fairings, etc.).

A number of embodiments of the present disclosure have been described. While this specification contains many specific implementation details, there should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps may be depicted in the drawings in a particular order, this should not be understood as requiring that such operations be performed in the particular order shown or in a sequential order, or that all illustrated operations be performed, to achieve desirable results.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

In certain implementations, multitasking and parallel processing may be advantageous. Nevertheless, it will be understood that various modifications may be made without departing from the spirit and scope of the claimed disclosure.

What is claimed is:

1. A method of tracking tilt in a motor vehicle, the method comprising:
   a. registering an at rest state of the motor vehicle with one or both of an electromechanical device and a solid state device;
   b. determining an amount of velocity of the motor vehicle at a given time interval;
   c. determining an amount of tilt of the motor vehicle during the given time interval;
   d. transmitting an indication of an amount of tilt experienced by the vehicle during motion of the motor vehicle; and
   e. displaying an indication of the amount of tilt on a human discernable display device, wherein no artificial delay is introduced from the time of determining an amount of tilt of the motor vehicle during motion and the display of the indication of the amount of tilt.

2. The method of claim 1 additionally comprising the step of determining an amount of acceleration of the vehicle during the given time interval.

3. The method of claim 2, additionally comprising the step of determining a direction of acceleration of the vehicle during the given time interval.

4. The method of claim 3, additionally comprising the step of displaying an amount of acceleration of the vehicle during the given time interval.

5. The method of claim 4, additionally comprising the step of displaying a direction of acceleration of the vehicle during the given time interval.

6. The method of claim 5, additionally comprising the step of electronically determining a location of the motor vehicle during the given time interval.

7. The method of claim 6, additionally comprising the step of storing a sequence of time intervals and corresponding velocity of the motor vehicle and an amount of tilt of the motor vehicle during each respective time interval.

8. The method of claim 7, additionally comprising the step of storing an identification of an operator of the motor vehicle during each respective time interval.

9. The method of claim 7 additionally comprising the step of aggregating readings captured from devices included in multiple motor vehicles during multiple time intervals.

10. The method of claim 7 additionally comprising the step of capturing readings at multiple geographic locations.

11. The method of claim 7 additionally comprising the step of generating a map indicating a geographic location of a vehicle, a vehicle type, a velocity of the vehicle and an amount of tilt.

12. The method of claim 11 additionally comprising the step of generating a map indicating a geographic location of a vehicle, a vehicle type, a velocity of the vehicle and an amount of tilt.

13. The method of claim 12 additionally comprising transmitting a suggested velocity of a vehicle type at a specified location.

14. The method of claim 13 additionally comprising transmitting a suggested velocity of a vehicle type and a vehicle operator at a specified location.

* * * * *